(12) United States Patent
Kim et al.

(10) Patent No.: US 7,258,354 B2
(45) Date of Patent: Aug. 21, 2007

(54) INTEGRATED STEERING GEAR AND FRAME STRUCTURE

(75) Inventors: Dae-Jung Kim, Kyunggi-do (KR); Woo-Jin Cha, Kyunggi-do (KR)

(73) Assignee: Hyundai Mobis, Co., Ltd., Yongin-shi (KR)

( * ) Notice: Subject to any disclaimer, the term of this patent is extended or adjusted under 35 U.S.C. 154(b) by 414 days.

(21) Appl. No.: 10/983,607

(22) Filed: Nov. 9, 2004

(65) Prior Publication Data

US 2005/0116434 A1 Jun. 2, 2005

(30) Foreign Application Priority Data

Dec. 1, 2003 (KR) .................... 10-2003-0086227

(51) Int. Cl.
*B62D 3/12* (2006.01)
*B62D 21/00* (2006.01)

(52) U.S. Cl. .................... 280/124.109; 280/93.514

(58) Field of Classification Search ......... 280/124.109, 280/93.514, 93.515
See application file for complete search history.

(56) References Cited

U.S. PATENT DOCUMENTS

| | | | | |
|---|---|---|---|---|
| 4,392,545 A | * | 7/1983 | Harasaki et al. | 180/294 |
| 5,879,026 A | * | 3/1999 | Dostert et al. | 280/781 |
| 6,039,334 A | * | 3/2000 | Ozeki | 280/93.514 |
| 6,152,254 A | * | 11/2000 | Phillips | 180/422 |
| 6,572,125 B2 | * | 6/2003 | Erickson et al. | 280/93.514 |
| 6,733,021 B1 | * | 5/2004 | Ziech et al. | 280/124.109 |
| 6,783,157 B2 | * | 8/2004 | Huang et al. | 280/785 |

FOREIGN PATENT DOCUMENTS

KR 2003-0006651 1/2003

OTHER PUBLICATIONS

English Language Abstract of Korean Application No. 2003-0006651.

* cited by examiner

*Primary Examiner*—Paul N. Dickson
*Assistant Examiner*—Laura B. Freedman
(74) *Attorney, Agent, or Firm*—Greenblum & Bernstein, P.L.C.

(57) ABSTRACT

An integrated steering gear and frame structure is designed to modularize a sub-frame as a suspension system and a steering gear as a steering system. Thus, a separate assembly process for the sub-frame and the steering gear is not required, so that a production process can be simplified and an assembly capability can be improved.

6 Claims, 2 Drawing Sheets

[FIG. 3]
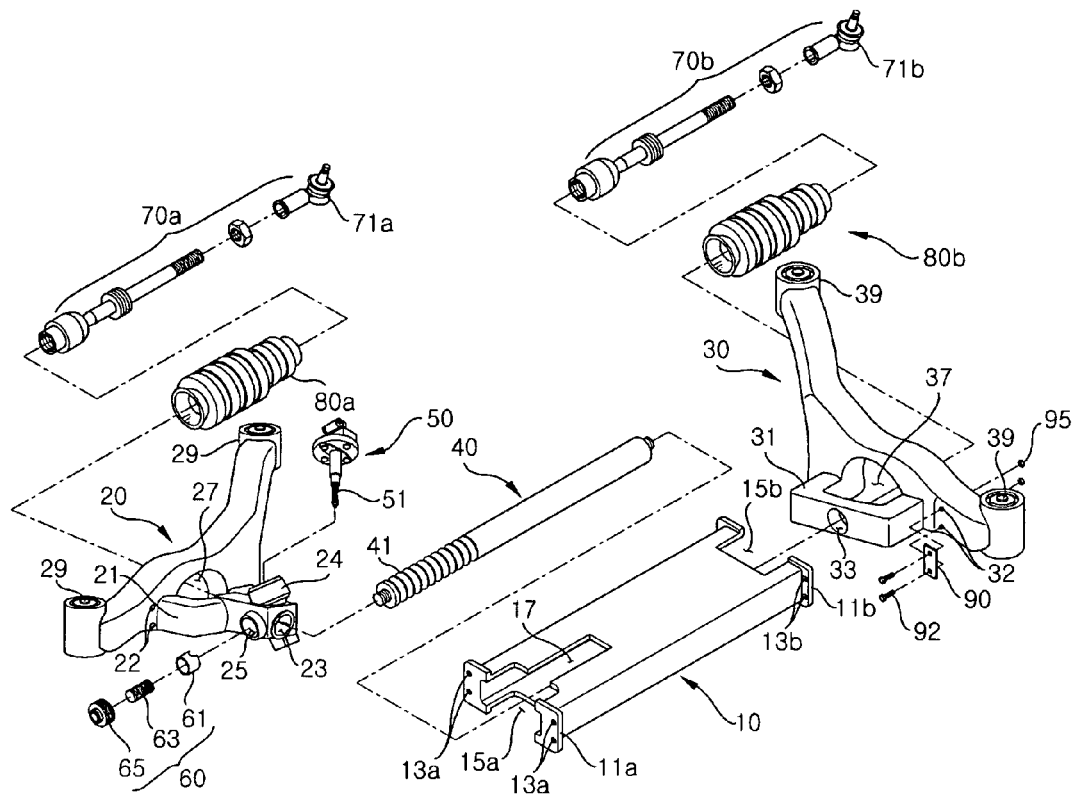
[FIG. 4]
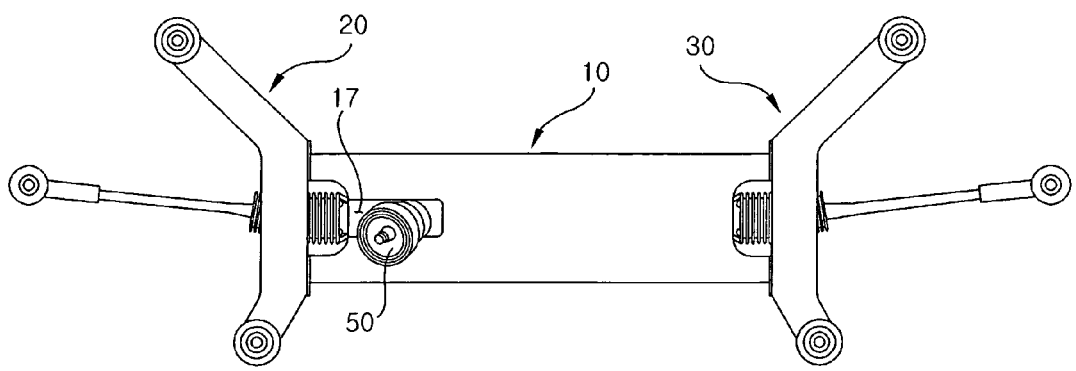

INTEGRATED STEERING GEAR AND FRAME STRUCTURE

RELATED APPLICATIONS

The present disclosure relates to subject matter contained in priority Korean Application No. 10-2003-0086227, filed on Dec. 1, 2003, which is herein expressly incorporated by reference in its entirety.

BACKGROUND OF THE INVENTION

1. Field of the Invention

The present invention relates to an integrated steering gear and frame structure, and more particularly to an integrated steering gear and frame structure, in which a sub-frame as a suspension system and a steering gear as a steering system are modularized.

2. Description of the Related Art

In general, a steering system is a machine by which a vehicle is steered to be turned to follow the desired traveling course of its driver, and is composed of a manipulation mechanism having a steering wheel, a steering shaft, a steering column, etc. so as to transmit a manipulation force caused by a direct steering manipulation of the driver to a steering gear, a linkage and so on, a gearing for decreasing rotation of the steering shaft to increase the manipulation force and simultaneously changing movement direction of the manipulation mechanism to transmit the changed movement direction to a link mechanism. The gearing typically makes much use of a rack-pinion mode, and particularly a rack-pinion steering gear is housed in a steering gear box, which is stably mounted to a vehicular body via mounting brackets.

One of conventional structures for mounting the steering gear to the vehicular body is shown in FIG. 1. In particular, FIG. 1 shows a conventional rack-pinion steering gear mounting structure. As shown in FIG. 1, two upper and lower steel plates are pressed in a specific shape and are welded to form a sub-frame 100 in a tube shape. A steering gear box 200 is fixed to the upper steel plate 110 of the sub-frame 100 by mounting brackets 150 and 170. The steering gear box 200 is provided with a rack bar through-hole through which a rack bar is inserted, a pinion housing 210 into which a pinion is inserted, and a yoke part insertion part 230 into which a yoke part is inserted, as well as is assembled by inserting the rack bar, the pinion and the yoke part. Meanwhile, both ends of the sub-frame 100 are formed with mounting parts 130 for fixture with the vehicular body and are connected to the vehicular body. Further, both ends of the sub-frame 100 are connected with control arms 300, which constitute the suspension system and are adjacent to the mounting parts. In this manner, the sub-frame 100 and the steering gear box 200 are separately prepared and assembled.

Meanwhile, another conventional rack-pinion steering gear is disclosed in Korean Patent Publication No. 2003-0006651. FIG. 2 is a cross-sectional view showing the conventional rack-pinion steering gear. As shown in FIG. 2, in a steering gear box 1, a pinion 2 mounted to a leading end of the steering shaft is meshed with a rack 3, and thus rotation of the pinion 2 causes the rack 3 to move in a transverse direction. The transverse movement of the rack 3 is transmitted to a steering shaft and a tie rod coupled to both ends of the rack 3 by a ball joint. The coupling of the pinion 2 and rack 3 in the steering gear box 1 is designed to adjust a clearance through a rack guide 6 and a nut 7. The rack guide 6 is recessed in a semi-cylindrical shape on its side so that the rack 3 meshed with the pinion 2 and moving in the transverse direction is supported on the side of the pinion 2. The rack guide 6 is inserted into one end of the steering gear box 1. The nut 7 is threaded on its inner circumferential surface so as to position and fix the rack guide 6, and is formed with a bolt head 8 on its outer side so as to be screwed to one end of the steering gear box 1. Further, the other side of the rack guide 6 is formed with a recess, and endows a damping force to contact surfaces between the rack guide 6 and the nut 7 between which a spring 10 is interposed. Therefore, it is possible to adjust a meshed state of the pinion 2 and the rack 3 either by inserting the nut 7 to cause the rack guide 6 to close contact the rack 3 on the side of the pinion 2 via the spring 10 or by retreating the nut 7.

However, the structure mounting the steering gear to the vehicular body as mentioned above has the following problems.

The sub-frame as the suspension system and the steering gear as the steering system are manufactured separately by their manufacturers, and are supplied to a module manufacturing firm or a vehicular manufacturing firm.

In this manner, the sub-frame and the steering gear are supplied to the module manufacturing firm or the vehicular manufacturing firm, and then are assembled by bolts or in another fastening method. The assembly is mounted to the vehicle.

Because the sub-frame and the steering gear are fastened by bolts or in another fastening method, some portions are overlapped to cause an assembling tolerance. Further, each of the sub-frame and the steering gear incurs a physical distribution cost.

Further, the production process by nature causes the sub-frame and the steering gear to be separately manufactured and assembled, so that a rate of generating manufacturing and assembling tolerances is increased.

Because the sub-frame and the steering gear are counterparts to each other, there is inconvenience in that each must be managed in tolerance, production and quality.

SUMMARY OF THE INVENTION

To solve the above-indicated problems, it is, therefore, an objective of the present invention to provide an integrated steering gear and frame structure, capable of removing a separate assembly process, simplifying a production process, and improving an assembly capability, as well as capable of reducing the number of components, saving a production cost and thus improving productivity, and reducing the weight of the vehicular body and thus enhancing the fuel efficiency of a vehicle.

It is another objective of the present invention to provide an integrated steering gear and frame structure, capable of performing a consistent quality management due to modularization of a steering system and a suspension system into one piece, and facilitating a component management.

It is yet another objective of the present invention to provide an integrated steering gear and frame structure, in which, even though the specification of the vehicle is changed, only the mounting brackets can be mounted through their modification and development, so that the compatibility of the steering components can be secured.

Moreover, it is still yet another objective of the present invention to provide an integrated steering gear and frame structure, in which the modularization of the steering system and the suspension system allows components in the engine room to be reduced, so that the engine room of the vehicle can be simplified.

It is still yet another objective of the present invention to provide an integrated steering gear and frame structure, in which the first and second mounting brackets are compatible with various types of vehicles and suspension systems, so that production expense and cost can be saved.

To achieve the above objectives, there is provided an integrated steering gear and frame structure comprising: a sub-frame body through which a rack bar passes in the width direction of a vehicular body; a first mounting bracket assembled to a left side of the sub-frame body and mounted to the vehicular body; and a second mounting bracket assembled to a right side of the sub-frame body and mounted to the vehicular body, wherein the rack bar, the sub-frame body and the first and second mounting brackets are modularized.

According to this configuration, the rack bar, the sub-frame body and the first and second mounting brackets are modularized into one piece and the modularized piece is mounted to the vehicular body, so that the separate assembly process is not required, and thus the production process is simplified and the assembly capability is improved.

Thus, the number of components is reduced and the production costs is saved, so that the productivity is improved. Further, as the number of components is reduced, the weight of the vehicular body is reduced and the fuel efficiency of the vehicle is improved.

Further, as the steering system and the suspension system is modularized into one piece, the quality management is consistently performed and thus the component management is facilitated.

Furthermore, even though the specification of the vehicle is changed, only the mounting brackets can be mounted after their modification and development, so that the compatibility of the steering components can be secured.

In addition, the modularization of the steering system and the suspension system allows components in the engine room to be reduced, so that the engine room of the vehicle can be simplified.

In the above-mentioned configuration, the first and second mounting brackets are each formed with a bracket insertion part mounted to the sub-frame body.

Further, the bracket insertion part of the first mounting bracket includes a first rack bar through-hole through which one end of the rack bar passes, a pinion insertion part communicated with the rack bar through-hole and inserted by a pinion, and a yoke part insertion hole drilled backward of the vehicular body in communication with the rack bar through-hole and the pinion insertion part and inserted by a yoke part; and the bracket insertion part of the second mounting bracket is provided with a second rack bar through hole through which the other end of the rack bar passes.

Meanwhile, the sub-frame body may be formed with a pinion fastening part so that the pinion insertion part can be assembled.

Furthermore, a plate may be further mounted between the first mounting bracket and the sub-frame body.

Further, the plate may be further mounted between the second mounting bracket and the sub-frame body.

In this manner, the plate is mounted between the first and second mounting brackets and the mounts. Thus, even in the case where the first and second mounting brackets mounted on the vehicular body are changed in their locations according to the types of the vehicles, it is possible to accept a geometry of the changed mounting parts. Thus, the first and second mounting brackets are compatible with various types of vehicles and suspension systems.

Thereby, the production expense and cost can be saved.

BRIEF DESCRIPTION OF THE DRAWINGS

The above objects, features and advantages of the present invention will become more apparent from the following detailed description when taken in conjunction with the accompanying drawings, in which:

FIG. 3 is an exploded perspective view showing an integrated steering gear and frame structure according to a preferred embodiment of the invention; and FIG. 4 is an assembled plan view of the integrated steering gear and frame structure of FIG. 3.

DETAILED DESCRIPTION OF THE PREFERRED EMBODIMENT

Figure 1:
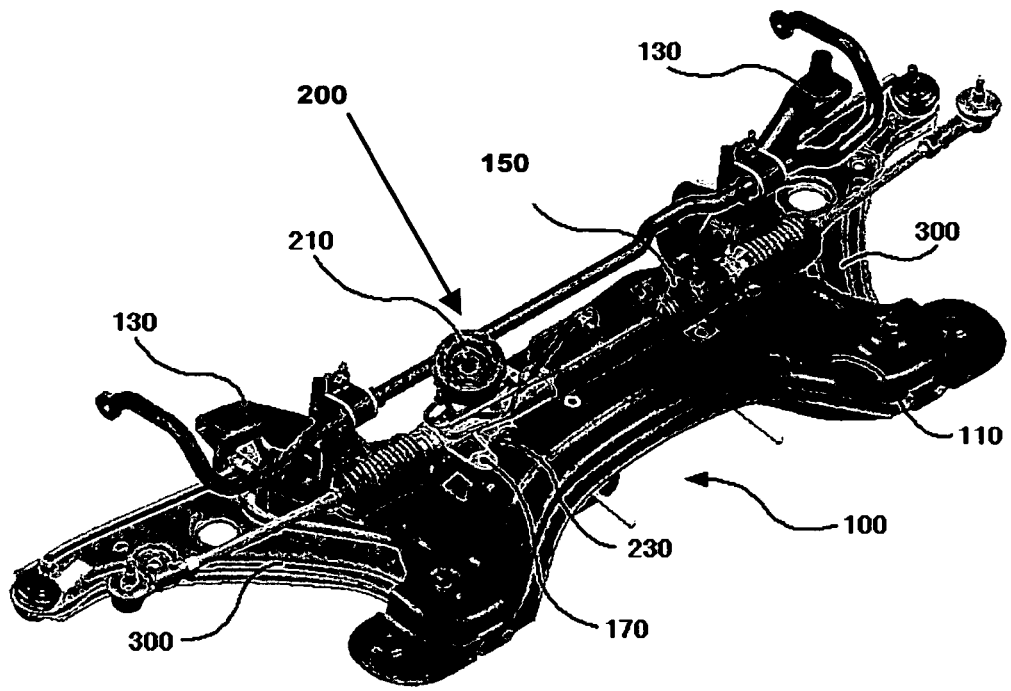
FIG. 1 is a perspective view showing a conventional rack-pinion steering gear mounting structure.
Figure 2:
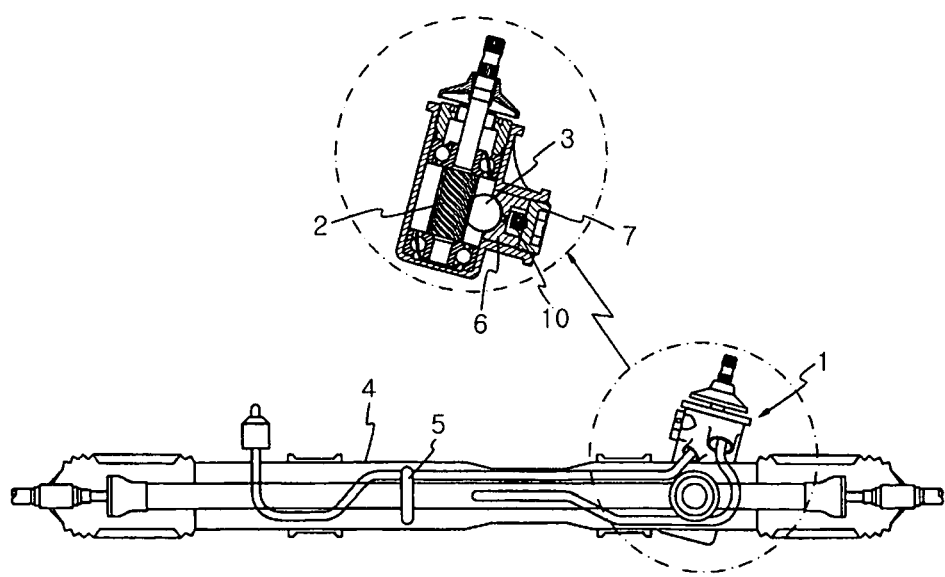
FIG. 2 is a cross-sectional view showing another conventional rack-pinion steering gear.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 3 is an exploded perspective view showing an integrated steering gear and frame structure according to a preferred embodiment of the invention, and FIG. 4 is an assembled plan view of the integrated steering gear and frame structure of FIG. 3.

As shown in FIGS. 3 and 4, the integrated steering gear and frame structure according to the embodiment includes a sub-frame body 10 through which a rack bar 40 passes in the width direction of a vehicular body, a first mounting bracket 20 connected to the left side of the sub-frame body 10 and mounted to the vehicular body, and a second mounting bracket 30 connected to the right side of the sub-frame body 10 and mounted to the vehicular body.

The rack bar 40 is provided with a rack gear 41 meshed with a pinion gear 51 which will be described below.

Both opposite ends of the rack bar 40 are connected with ball joint parts 71a and 71b of tie rod assemblies 70a and 70b, respectively.

The tie rod assemblies 70a and 70b connected with the rack bar 40 are enclosed with bellows 80a and 80b, respectively.

The bellows 80a and 80b are elastically displaced according to movement of the tie rod assemblies 70a and 70b, and blocks internal introduction of foreign materials.

The sub-frame body 10 is preferably formed in a hollow shape so that the rack bar 40 is able to pass through the vehicular body in the width direction.

Here, because the sub-frame body 10 is a part of a suspension system, it is natural that, as the suspension system is variously changed according to a type of the vehicle, the shape of the sub-frame body 10 may be changed variously.

Both ends of the sub-frame body 10 are formed with mounts 11a and 11b respectively, each of which extends outward along the peripheral of the respective end.

The mounts 11a and 11b are drilled with a plurality of fastening holes 13a and 13b, respectively.

Meanwhile, both ends of the sub-frame body 10 may be formed with bellows motion spaces 15a and 15b as spaces which the bellows 80a and 80b are able to move.

These bellows motion spaces 15a and 15b are preferably formed in such a manner that the end of the sub-frame body 10 is partly cut off by the space which each of the bellows 80a and 80b moves.

In this manner, it is natural that the bellows motion spaces 15a and 15b formed by partly cutting out both ends of the sub-frame body 10 may be formed only on the upper portion of the sub-frame body 10 or on the upper and lower portions of the sub-frame body 10 at the same time.

Both ends of the first mounting bracket 20 are formed with bushed mounting parts 29 as in the known art so that the first mounting bracket 20 can be mounted to the vehicular body. Similarly, both ends of the second mounting bracket 30 are formed with bushed mounting parts 39 as in the known art so that the second mounting bracket 30 can be mounted to the vehicular body.

Further, the first and second mounting brackets 20 and 30 are formed with bellows reception parts 27 and 37 respectively, so as to receive the bellows 80a and 80b provided to the tie rod assemblies 70a and 70b connected with the rack bar 40 when the first and second mounting brackets 20 and 30 are mounted to both ends of the sub-frame body 10.

The first and second mounting brackets 20 and 30 are formed with insertion parts 21 and 31, which are adapted to be inserted into both ends of the sub-frame body 10 outside the bellows reception parts 27 and 37.

The first and second mounting brackets 20 and 30 are drilled with fastening holes 22 and 32 having a size and a location corresponding to those of the fastening holes 13a and 13b of the mounts 11a and 11b of the sub-frame body 10 so that the bracket insertion parts 21 and 31 of the first and second mounting brackets 20 and 30 are inserted and assembled into both ends of the sub-frame body 10.

Meanwhile, the bracket insertion part 21 of the first mounting brackets 20 includes a rack bar through-hole 23 drilled in the width direction of the vehicular body, a pinion insertion part 24 protruded in communication with the rack bar through-hole 23, and a yoke part insertion hole 25 drilled backward of the vehicular body in communication with the rack bar through-hole 23 and the pinion insertion part 24.

One end of the rack bar 40 passes through the rack bar through-hole 23.

The pinion insertion part 24 is inserted by a pinion assembly 50, which is formed with a pinion gear 51.

In other words, the pinion insertion part 24, as the same type and structure similar to the pinion housing formed in the conventional steering gear box, is formed in the bracket insertion part 21.

A yoke part 60 is inserted into the yoke part insertion hole 25.

The yoke part 60 consists of a support yoke 61 which directly comes into close contact with the rear portion of the rack bar 40, a yoke plug 65 closing the yoke part insertion hole 25, and a spring 63 provided between the support yoke 61 and the yoke plug 65.

The yoke part 60 constructed in this manner functions to help the pinion assembly 50 and the rack bar 40 couple with a proper frictional force at the rear of the rack bar 40.

Meanwhile, the sub-frame body 10 is preferably formed with a pinion fastening part 17 so that the pinion insertion part 24 protruded when the bracket insertion part 21 of the first mounting bracket 20 is inserted into the sub-frame body 10 can be assembled at a proper position.

The pinion fastening part 17 is connected with the bellows motion space 15a formed on the end of the sub-frame body 10 and is formed by being cut off by a space where the pinion insertion part 24 is assembled.

The bracket insertion part 31 of the second bracket 30 is drilled with a rack bar through-hole 33 through which the rack bar 40 passes.

It is natural that both ends of the first and send mounting brackets 20 and 30 constructed in this manner are provided with a bracket (not shown) etc., and may be mounted with a control arm as in the prior art.

Meanwhile, in the above-mentioned configuration, the bracket insertion part 21 of the first mounting bracket 20 is provided with the rack bar through-hole 23, the pinion insertion part 24 and the yoke part insertion hole 25, while the bracket insertion part 31 of the second mounting bracket 30 is drilled with the rack bar through-hole 33. This case is applied to the vehicle where the driver seat is located on the right side.

However, in the case of the vehicle where the driver seat is located on the left side, the first and second mounting brackets 20 and 30, naturally, may be reversed each other as the location of the pinion assembly 50 is changed.

In this manner, if the location of the pinion assembly 50 is changed, the location of the pinion fastening part 17 formed on the sub-frame body 10 may be changed.

Hereinafter, description will be made regarding an operation of the embodiment having the above-mentioned configuration.

To begin, the one end of the rack bar 40 passes through the rack bar through-hole 23 of the first mounting bracket 20, and the pinion assembly 50 is inserted into the pinion insertion part 24.

Thereby, the rack gear 41 of the rack bar 40 is meshed with the pinion gear 51 of the pinion assembly 50, so that rotation of the pinion gear 51 causes the rack gear 41 to move in the transverse direction.

Meanwhile, the support yoke 61 and the spring 63 are inserted into the yoke part insertion hole 25 of the first mounting bracket 20, and the yoke plug 65 is also mounted to the yoke part insertion hole 25, so that the rear portion of the rack bar 40 is supported.

Then, the one end of the sub-frame body 10 is closely contacted with the bracket insertion part 21 of the first mounting bracket 20.

Here, because the pinion fastening part 17 is formed with the sub-frame body 10, the sub-frame body 10 can be completely and closely contacted with the bracket insertion part 21 without obstruction by the protruded pinion insertion part 25.

Then, the fastening holes 13a drilled on the mount 11a formed on one end of the sub-frame body 10 and the fastening holes 22 of the first mounting bracket 20 are fastened with a fastening means such as a bolt 92, and thereby the first mounting bracket 20 is connected with the sub-frame body 10.

Meanwhile, the bracket insertion part 31 of the second mounting bracket 30 is closely contacted with the other end of the sub-frame body 10. In this case, the other end of the rack bar 40 passing through the sub-frame body 10 is inserted into the rack bar through-hole 33 of the second mounting bracket 30.

Similarly to the first mounting bracket 20, the fastening holes 13b drilled on the mount 11b of the sub-frame body 10 and the fastening holes 32 of the second mounting bracket 30 are fastened with the fastening means.

Both ends of the rack bar 40 passing through the rack bar through-holes 23 and 33 of the first and second mounting brackets 20 and 30 are coupled with the ball joint parts 71a and 71b of the tie rod assemblies 70a and 70b, respectively.

Then, the tie rod assemblies 70a and 70b coupled with the rack bar 40 are provided with the bellows 80a and 80b through the bellows reception parts 27 and 37 of the first and second mounting brackets 20 and 30, respectively.

In this manner, by assembling the rack-pinion steering gear to the first mounting bracket 20, and then the sub-frame body 10, and finally the second mounting bracket 30, the steering system and the suspension system are modularized into one piece. Thereby, the first and second mounting brackets 20 and 30 can be mounted to the vehicular body by their bushed mounting parts 29 and 39.

Because the steering system and the suspension system are modularized into one piece, a separate assembly process is not required, and the resultant production process is simplified and the assembly capability is improved.

Therefore, the number of components is decreased, so that production costs are saved and the productivity is improved. As the number of components is decreased, the weight of the vehicular body is reduced and the fuel efficiency of the vehicle is improved.

Further, as the steering system and the suspension system are modularized into one piece, the quality management is consistently performed, and thus the component management is facilitated.

Moreover, even though the specification of the vehicle is changed, only the mounting brackets can be mounted after their modification and development, so that it is possible to share steering components.

In addition, the modularization of the steering system and the suspension system allows components in the engine room to be reduced, so that the engine room of the vehicle is simplified.

Here, a plate 90 is further mounted between the first mounting bracket 20 and the sub-frame body 10 and/or between the second mounting bracket 30 and the sub-frame body 10.

For instance, When the bracket insertion parts 21 and 31 of the first and second mounting brackets 20 and 30 are assembled to the sub-frame body 10, the plate 90 is further mounted between the first or second mounting bracket 20 or 30 and the mount 11a or 11b of the sub-frame body 10.

The plate 90 is drilled with the fastening hole to which the bolt 92 is fastened.

It is shown in the drawing that the plate 90 is mounted between the second mounting bracket 30 and the mount 11b of the sub-frame body 10. However, it is natural that the plate 90 may be mounted between the first mounting bracket 20 and the mount 11a, or between the first and second mounting brackets 20 and 30 and the mounts 11a and 11b.

Further, the plate 90 may be mounted through duplication of two or more, or through change in thickness.

In this manner, because the plate 90 may be additionally mounted between the first and second mounting brackets 20 and 30 and the mounts 11a and 11b, the locations of the first and second mounting brackets 20 and 30 may be changed.

Thus, even in the case where the first and second mounting brackets 20 and 30 mounted on the vehicular body are changed in their locations, the plate 90 is mounted between the first and second mounting brackets 20 and 30 and the mounts 11a and 11b, and thereby it is possible to accept a geometry of the changed mounting parts 29 and 39. Thus, the first and second mounting brackets 20 and 30 are compatible with various types of vehicles and suspension systems.

Due to this compatibility of the first and second mounting brackets 20 and 30, it is possible to save production expenses and costs.

While the invention has been shown and described with reference to certain preferred embodiments thereof, it will be understood by those skilled in the art that various changes in form and details may be made therein without departing from the spirit and scope of the invention as defined by the appended claims.

The integrated steering gear and frame structure as set forth above has the following effects.

The rack bar, the sub-frame body and the first and second mounting brackets are modularized into one piece and the modularized piece is mounted to the vehicular body, wherein the rack bar passes through the sub-frame body, and the first and second mounting brackets are connected to the left and right sides of the sub-frame body and are mounted to the vehicular body. Thereby, the separate assembly process is not required, and the production process is simplified and the assembly capability is improved.

As such, the number of components is reduced and the production costs is saved, so that the productivity is improved. Further, as the number of components is reduced, the weight of the vehicular body is reduced and the fuel efficiency of the vehicle is improved.

Further, as the steering system and the suspension system is modularized into one piece, the quality management is consistently performed and thus the component management is facilitated.

Furthermore, even though the specification of the vehicle is changed, only the mounting brackets can be mounted after their modification and development, so that the compatibility of the steering components can be secured.

In addition, the modularization of the steering system and the suspension system allows components in the engine room to be reduced, so that the engine room of the vehicle can be simplified.

Meanwhile, the plate is mounted between the first and second mounting brackets and the mounts. Thus, even in the case where the first and second mounting brackets mounted on the vehicular body are changed in their locations according to the types of the vehicles, it is possible to accept a geometry of the changed mounting parts. Thus, the first and second mounting brackets are compatible with various types of vehicles and suspension systems.

This compatibility of the first and second mounting brackets can result in saving production expense and cost.

What is claimed is:

1. An integrated steering gear and frame structure comprising:
 a sub-frame body through which a rack bar passes in a width direction of a vehicular body;
 a first mounting bracket having a first bracket insertion part connected to a first side of the sub-frame body, the first mounting bracket configured to be mounted on the vehicular body, wherein the first bracket insertion part includes:
 a first rack bar through-hole through which a first end of the rack bar passes, a pinion insertion part communicating with the first rack bar through-hole and configured to receive a pinion, and a yoke part insertion hole configured to receive a yoke part, the yoke part insertion hole communicating with the first rack bar through-hole and the pinion insertion part; and a second mounting bracket having a second bracket insertion part connected to a second side of the sub-frame body and mounted to the vehicular body, the rack bar, the sub-frame body and the first and second mounting brackets being coupled to each other, wherein the second bracket insertion part of the second mounting bracket is provided with a second rack bar through hole through which a second end of the rack bar passes.

2. The integrated steering gear and frame structure as claimed in claim 1, wherein the sub-frame body is formed with a pinion fastening part so that the pinion insertion part can be coupled to the sub-frame body.

3. The integrated steering gear and frame structure as claimed in claim 2, further comprising a plate mounted between the first mounting bracket and the sub-frame body.

4. The integrated steering gear and frame structure as claimed in claim 2, further comprising a plate mounted between the first mounting bracket and the sub-frame body.

5. The integrated steering gear and frame structure as claimed in claim 1, further comprising a plate mounted between the first mounting bracket and the sub-frame body.

6. The integrated steering gear and frame structure as claimed in claim 1, further comprising a plate between the second mounting bracket and the sub-frame body.

* * * * *